US012300009B2

(12) United States Patent
Arlazarov et al.

(10) Patent No.: US 12,300,009 B2
(45) Date of Patent: May 13, 2025

(54) METHOD FOR DETECTING HOLOGRAPHIC ELEMENTS ON DOCUMENTS IN A VIDEO STREAM

(71) Applicant: Smart Engines Service, LLC, Moscow (RU)

(72) Inventors: Vladimir Viktorovich Arlazarov, Moscow (RU); Leisan Ildarovna Koliaskina, Ufa (RU); Dmitry Petrovich Nikolaev, Moscow (RU); Dmitry Valerevich Polevoy, Moscow (RU); Daniil Vyacheslavovich Tropin, Moscow (RU); Sergey Aleksandrovich Usilin, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 429 days.

(21) Appl. No.: 17/941,981

(22) Filed: Sep. 9, 2022

(65) Prior Publication Data
US 2023/0085858 A1    Mar. 23, 2023

(30) Foreign Application Priority Data

Jul. 22, 2021 (RU) .......................... RU2021121819

(51) Int. Cl.
*G06V 30/14* (2022.01)
*G06V 30/18* (2022.01)

(52) U.S. Cl.
CPC .... *G06V 30/1448* (2022.01); *G06V 30/18105* (2022.01)

(58) Field of Classification Search
None
See application file for complete search history.

(56) References Cited

U.S. PATENT DOCUMENTS 10,354,142 B2 * 7/2019 Arlazarov .............. G06V 10/56
10,712,203 B2 * 7/2020 Okada ..................... G01J 3/524
(Continued)

OTHER PUBLICATIONS

Hartl et al. "AR-Based Hologram Detection on Security Documents Using a Mobile Phone", ISVC 2014, Part II, LNCS 8888, pp. 335-346, 2014 (Year: 2014).*

(Continued)

*Primary Examiner* — Randolph I Chu
(74) *Attorney, Agent, or Firm* — Procopio, Cory, Hargreaves & Savitch LLP

(57) ABSTRACT

A method for detecting security holograms on documents in a video stream is disclosed, including: searching for interest points and calculating descriptors in a frame; filtering of interest points in the previous frame so that only points located inside the quadrangle of the outer borders of the document remain; matching the descriptors of interest points of the current and previous frames; application of an algorithm for estimating the parameters of projective transformation between the frames; projective transformation of the quadrangle of the outer boundaries of the document from the previous frame to obtain the outer boundaries of the document in the current frame; document image normalization; calculating the color saturation and hue; updating the saturation and hue values; further considering the pixels of the normalized document image with brightness values not exceeding a preset threshold; filtration of the obtained image.

2 Claims, 8 Drawing Sheets

(56) References Cited

U.S. PATENT DOCUMENTS

| | | | |
|---|---|---|---|
| 2011/0204142 A1* | 8/2011 | Rao | G06Q 10/06 |
| | | | 235/492 |
| 2016/0125613 A1* | 5/2016 | Shustorovich | G06V 10/242 |
| | | | 382/140 |
| 2019/0170585 A1* | 6/2019 | Okada | G01J 3/524 |
| 2022/0398859 A1* | 12/2022 | Botros | G06V 10/7715 |
| 2023/0353388 A1* | 11/2023 | Morishita | G06V 10/141 |
| 2024/0354917 A1* | 10/2024 | Arlazarov | G06V 30/40 |

OTHER PUBLICATIONS

Hart et al. "Mobile Interactive Hologram Verification", IEEE International Symposium on Mixed and Augmented Reality 2013 (Year: 2013).*

Samarasinghe et al. "Sri Lanka Driving License Forgery Detection", 2017 Fourth International Conference on Image Information Processing (ICIIP) (Year: 2017).*

Hartl et al. "Towards Mobile Recognition and Verification of Holograms using Orthogonal Sampling", 2015 IEEE International Symposium on Mixed and Augmented Reality Workshops (Year: 2015).*

Kada et al. "Hologram Detection for Identity Document Authentication", Lecture Notes in Computer Science • Jun. 2022 (Year: 2022).*

Yang et al. "High-Resolution Hologram Calculation Method Based on Light Field Image Rendering", Appl. Sci. 2020 (Year: 2020).*

\* cited by examiner

METHOD FOR DETECTING HOLOGRAPHIC ELEMENTS ON DOCUMENTS IN A VIDEO STREAM

RELATED APPLICATIONS INFORMATION

The present application claims priority under 35 U.S.C. 119(a) to Russian Patent Serial No. 2021121819, entitled "Method for Detecting Holographic Elements on Documents in a Video Stream", filed on Jul. 22, 2021, which is incorporated herein by reference as if set forth in full.

TECHNICAL FIELD

The invention relates to the field of computer technology for detecting security holograms on documents in a video stream.

BACKGROUND

Sources from the prior art disclose various methods for detecting security holograms on documents in a video stream. For example, U.S. Pat. No. 10,354,142 B2 (published on 2017-02-27) discloses a hologram search algorithm designed to search for holograms in document images from a video stream. The main idea of the algorithm is that the value of the color hue will change throughout the video stream for pixels related to the hologram. For matching the coordinate system between the frames of the video stream, a method is proposed to localize the analyzed document by searching for the document quadrangle in each frame independently. A histogram of hue values is made and analyzed for each pixel in the document. To neutralize document localization errors in each frame, the histogram is made by weighted averaging over a targeted window, where the value of pixel saturation in the window acts as a weight. Such averaging actually lowers the resolution of the analyzed image.

The work "AR-Based Hologram Detection on Security Documents Using a Mobile Phone" (Andreas Hartl, Clemens Arth, and Dieter Schmalstieg, published in December 2014) proposes a method for detecting holograms on document images from a video stream. Tracking is used to match the coordinate system between frames. The average value of the pixel (which we represent as a three-component vector) is analyzed, and the component-by-component mean-square deviation is also calculated. Further, pixels having a larger mean-square deviation are considered to be potential pixels of the hologram area. The method does not use any color correction, which leads to errors in detecting holograms in cases of changing lighting conditions or errors in the automatic white balance system. Also, the described analysis of pixels in the specified additive color model for their identification as those of the hologram area, in contrast to the method proposed in the current application, is not robust to emerging glares.

The objective of the invention is to eliminate the shortcomings of the known solutions.

SUMMARY

In an embodiment, a method for detecting security holograms on documents in a video stream is disclosed. The method comprising: localizing a document in the video stream; normalizing a document image of the localized document while the document image is projected into a rectangle with a known size, wherein the normalized document image is color-corrected to be resistant to changes in lighting and automatic white balancing; calculating a chromaticity vector for each pixel of the normalized document image, wherein the modulus of the chromaticity vector is equal to a saturation of the pixel and the angle of the chromaticity vector is equal to a hue of the pixel; updating saturation and hue values for each pixel of the normalized document image, the brightness value of which does not exceed a specified threshold, wherein the updated saturation and hue values include: (i) the maximum saturation value of all processed images of the document and (ii) the average value of the chromaticity vectors of all processed images of the document; generating a new image using pixels having updated saturation and hue values; filtering the new image using binarization; and finding connectivity components in the filtered image and filtering the connectivity components in accordance with a priori knowledge about a shape of holograms of the document.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The invention relates to the field of computer technology for detecting holographic protection on documents in a video stream. To do this, a method for detecting holographic protection on documents in a video stream is disclosed, including: searching for key points and calculating descriptors on the frame; filtering of key points on the previous frame so that only points located inside the quadrilateral of the external borders of the document remain; comparison of descriptors of key points of the current and previous frames; application of an algorithm for estimating the parameters of the projective transformation between frames; projective transformation of the quadrilateral of the external borders of the document from the previous frame to obtain the external borders of the document on the current frame; normalization of the document image; calculating saturation and color hue; updating the saturation and color hue values, while further pixels of the normalized image of the document are considered, the brightness values of which do not exceed the specified threshold; image filtering is performed.

EFFECT: an increase in the reliability of detecting holographic elements by preventing false detection errors on static color elements of the document.

The technical result provides an accurate matching of the coordinate system between frames, which makes it possible not to apply "averaging" and not to reduce the dimension of the analyzed images (providing more accurate detection of holograms), in eliminating errors in detecting holograms in cases of changing lighting conditions or errors of the automatic white balance system, and also in improving the reliability of detecting holographic elements, avoiding false detection errors on static color elements of the document.

On a given video stream containing a document, we assume that when falsifying a document and manipulating personal data (replacing a photo, replacing text, seals, etc.), there will be no holograms in the area of interest. It is necessary to detect the presence of holograms, and to identify and verify their location, thereby confirming the document authenticity and the absence of personal data falsification (photo replacement, etc.). A video stream consisting of color images containing a document is considered.

The detection of holograms is based on the accumulation and subsequent evaluation of the changes in hue and saturation (defining chroma) in each pixel. The described method has several main stages, which will be considered in detail.

Figure 1:
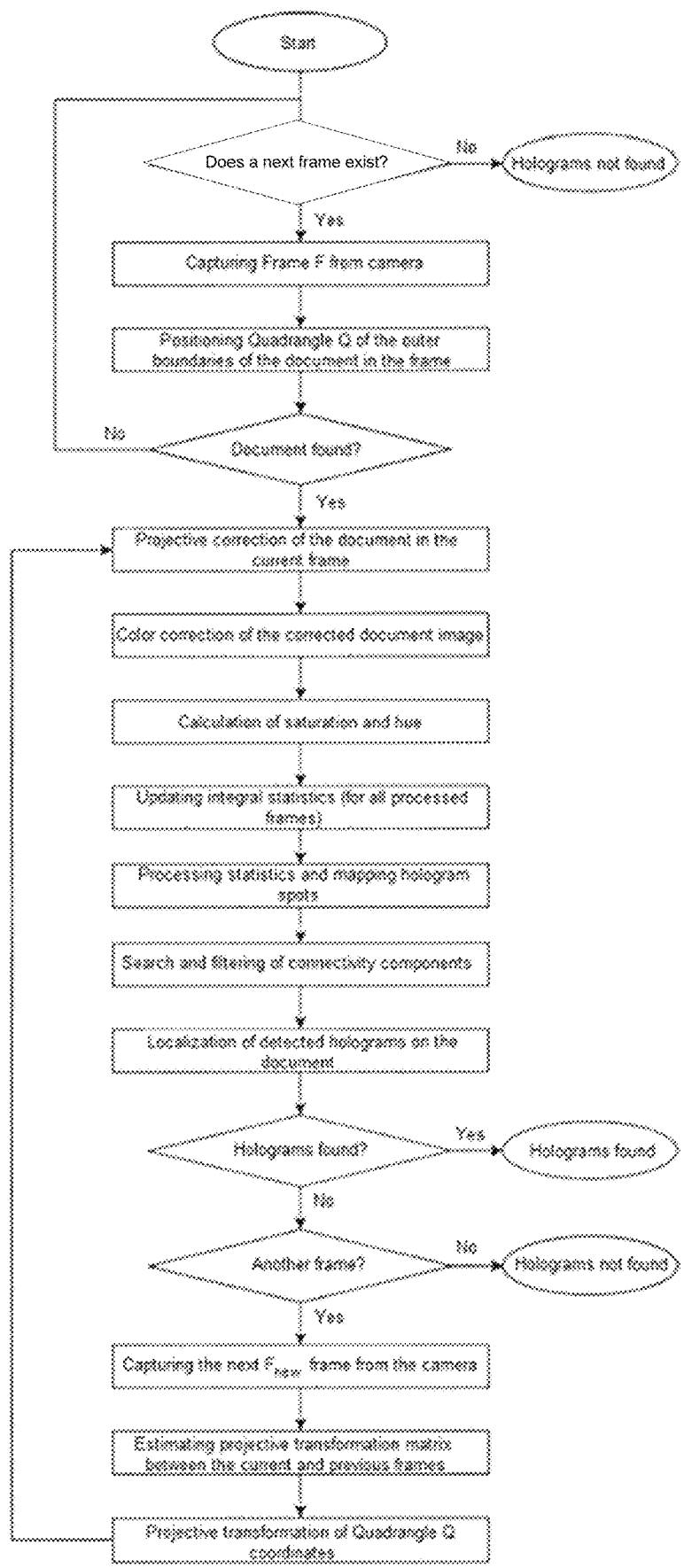
FIG. 1 illustrates block diagram of an algorithm for detection of holograms, according to an exemplary embodiment.

The algorithm scheme is shown in FIG. 1.

Stage 1: Tracking of a document in a video stream

An accurate matching of document coordinate systems in frames of the video stream is extremely important for an accurate calculation of per-pixel color values. To solve the task, the method proposes detecting a document (for example, using algorithms for searching quadrangles of the outer boundaries of a document, or by analyzing key points, or by matching patterns, or by machine learning methods, or otherwise) with the following application of tracking technologies.

The document is localized in the first frame of the video stream. If the document is not found, the frame is skipped and the action is repeated with a new frame of the video stream until the localization is successful.

A new frame is captured in the video stream, where the document is searched for by performing the following steps:
1. Searching for key points and calculating/determining descriptors of the key points in the current frame.
2. Filtering by key points in the previous frame so that only the points located inside a quadrangle of the outer borders of the document remain.
3. Matching the descriptors of the key points of the current and previous frames.
4. Applying an algorithm for estimating parameters of a projective transformation between frames (for example, algorithms for estimating parameters based on random samples like random sample consensus (RANSAC)).
5. Performing a projective transformation of the quadrangle of the outer boundaries of the document from the previous frame to obtain the outer boundaries of the document in the current frame.

Figure 2:
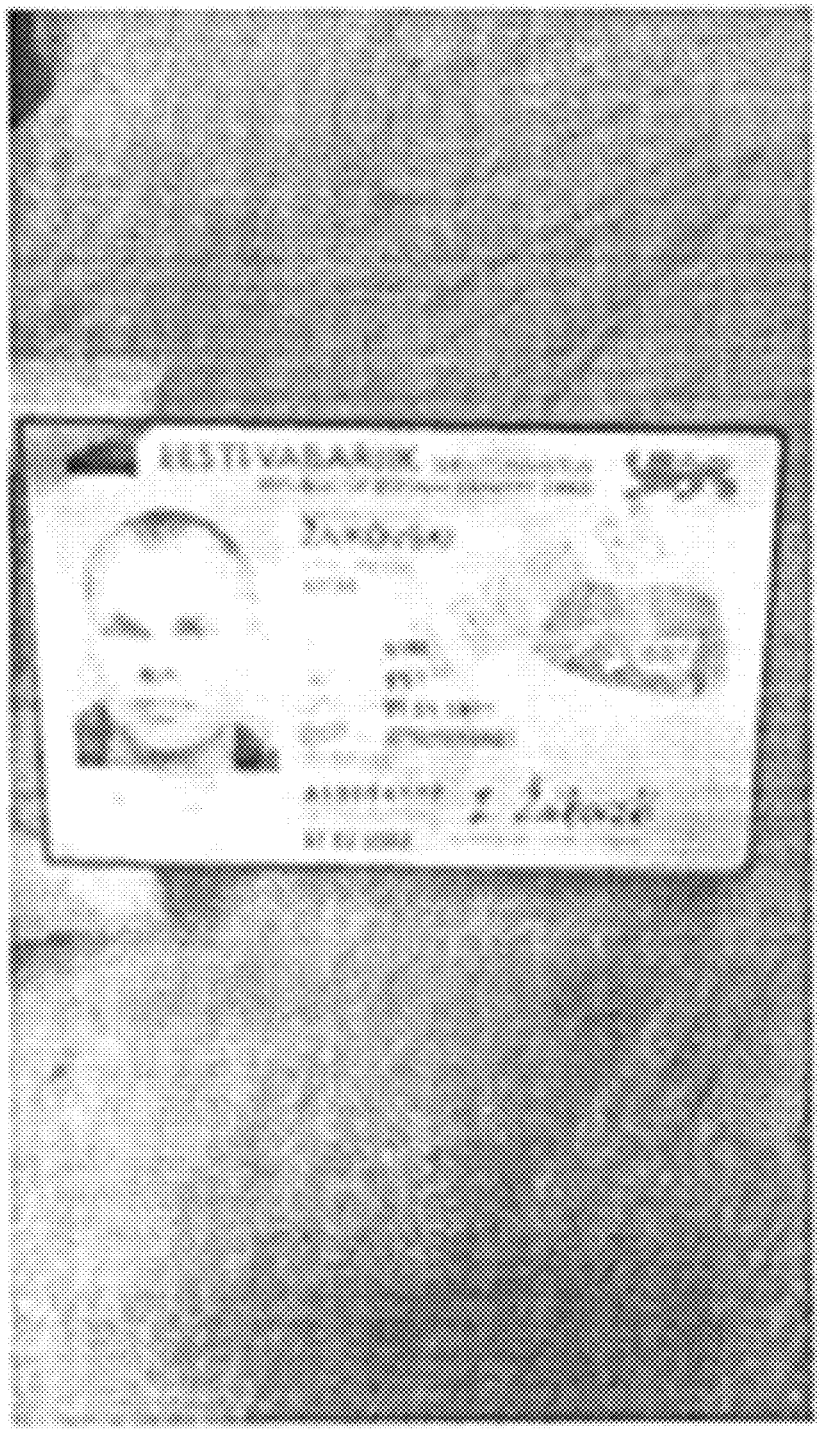
FIG. 2 illustrates a document containing holograms.
Figure 7:
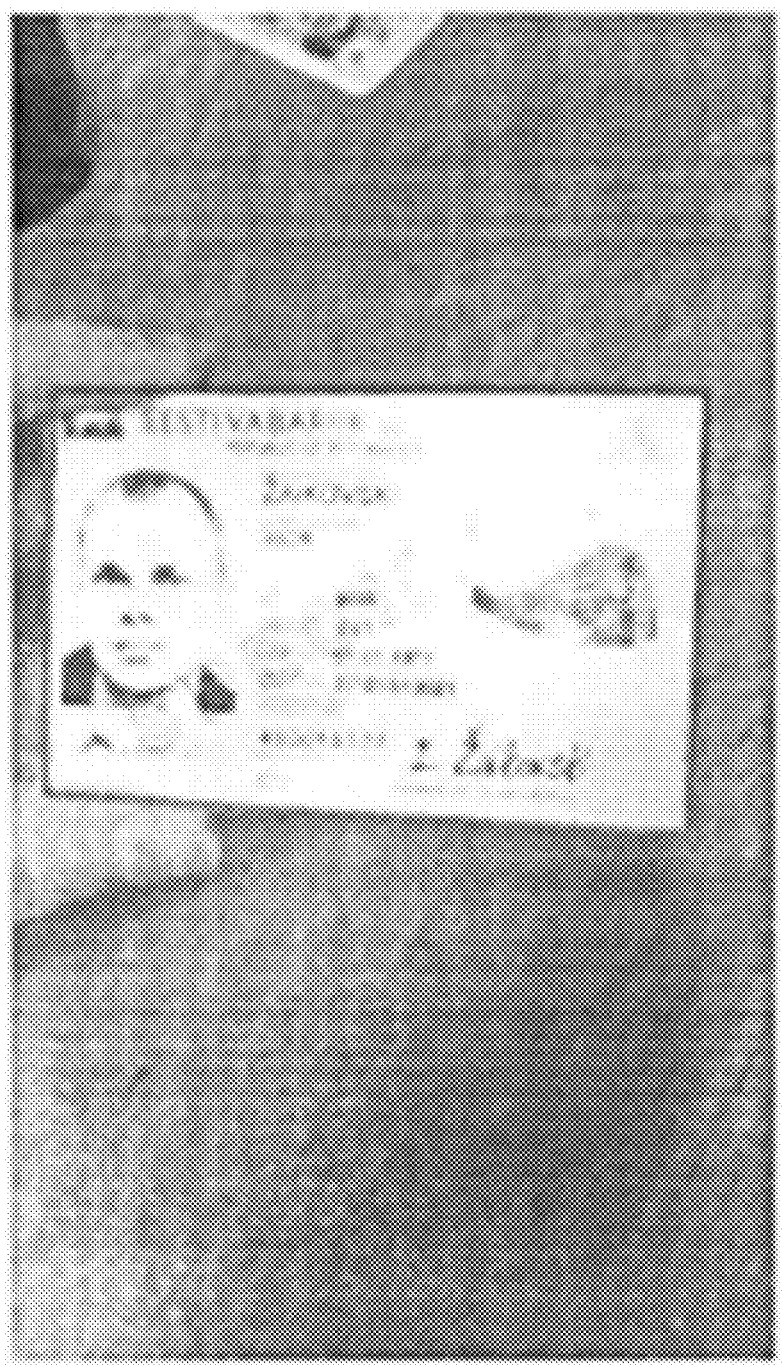
FIG. 7 illustrates a document not containing holograms.

An illustration of a localized document is shown in FIG. 2 for a document containing holograms, and in FIG. 7 for a document not containing holograms, respectively.

Stage 2: Document image normalization

The image of the found document is projectively mapped into a rectangle with a known size.

The resulting image is color-corrected to resist changes in lighting, as well as undesirable changes that may occur due to automatic white balancing performed by the video camera.

Color correction is carried out in a simplified von Kries model, and adaptation parameters are estimated using the Gray World algorithm as follows.

The R, G, B values of each image pixel are multiplied (with saturation with the maximum permissible value) by the coefficients calculated for the red, green and blue components as follows:

$$\overline{R} = \begin{cases} k_R \cdot R, & k_R \cdot R < 255 \\ 255, & \text{otherwise} \end{cases}$$

$$\overline{G} = \begin{cases} k_G \cdot G, & k_G \cdot G < 255 \\ 255, & \text{otherwise} \end{cases}$$

$$\overline{B} = \begin{cases} k_B \cdot B, & k_B \cdot B < 255 \\ 255, & \text{otherwise} \end{cases}$$

$$k_R = \frac{GrayVal}{\sum_i R_i}, \; k_G = \frac{GrayVal}{\sum_i G_i}, \; k_B = \frac{GrayVal}{\sum_i B_i}$$

$$GrayVal = \frac{\sum_i R_i + \sum_i G_i + \sum_i B_i}{3}$$

Alternatively, the coefficients $k_R$, $k_G$ and $k_B$ may be determined by calculating the median of the pixel values.

Figure 3:
FIGS. 3-6 illustrate the document of FIG. 2 during various steps of the algorithm of FIG. 1.
Figure 8:
FIGS. 8-11 illustrate the document of FIG. 7 during various steps of the algorithm of FIG. 1.

An illustration of a normalized document with color correction is shown in FIG. 3 for a document containing holograms, and in FIG. 8 for a document not containing holograms.

Stage 3: Calculation of saturation and hue

For each pixel of the document image, a chromaticity vector $\vec{C}$ is calculated, the module/magnitude of which is equal to the saturation, and the angle of which is equal to the color hue.

The saturation S is calculated as follows: S=max(R,G,B)−min(R,G,B)

The color hue H is calculated as follows:

$$H = \begin{cases} 2\pi(\overline{H}/6 + 1), & \overline{H} < 0 \\ 2\pi(\overline{H}/6), & \text{otherwise} \end{cases}$$

$$\overline{H} = \begin{cases} 0, & S = 0 \\ \dfrac{G - B}{S}, & M = R \\ \dfrac{B - R}{S} + 2, & M = G \\ \dfrac{R - G}{S} + 4, & M = B \end{cases}$$

Where M=max(R, G, B)

Stage 4: Updating saturation and hue values

Next, pixels of the normalized document image with brightness values not exceeding a specified threshold are considered. Since glares appear in the image in the form of "whitened" areas, such clipping by brightness allows us to neutralize the effect of glares on the hologram search algorithm.

Thus, the following values, calculated for all processed document images, are updated for each pixel of the normalized document image, the brightness value of which does not exceed the set threshold:

Maximum saturation value $S_{max}$

Average value of the chromaticity vectors $\overrightarrow{C_{mean}}$

Note that for pixels related to holograms, the $|\overrightarrow{C_{mean}}|$ value is close to zero, like for pixels with low saturation.

A new image $|\overrightarrow{C}|$ is formed, whose pixel value is calculated as follows:

$$|\vec{C'}| = \begin{cases} 255 \cdot \frac{|\vec{C}_{mean}|}{S_{max}}, & \text{if } S_{max} > S_{thresh} \\ 255, & \text{otherwise} \end{cases}$$

Here, $S_{thresh}$ is an algorithm parameter.

Figure 4:
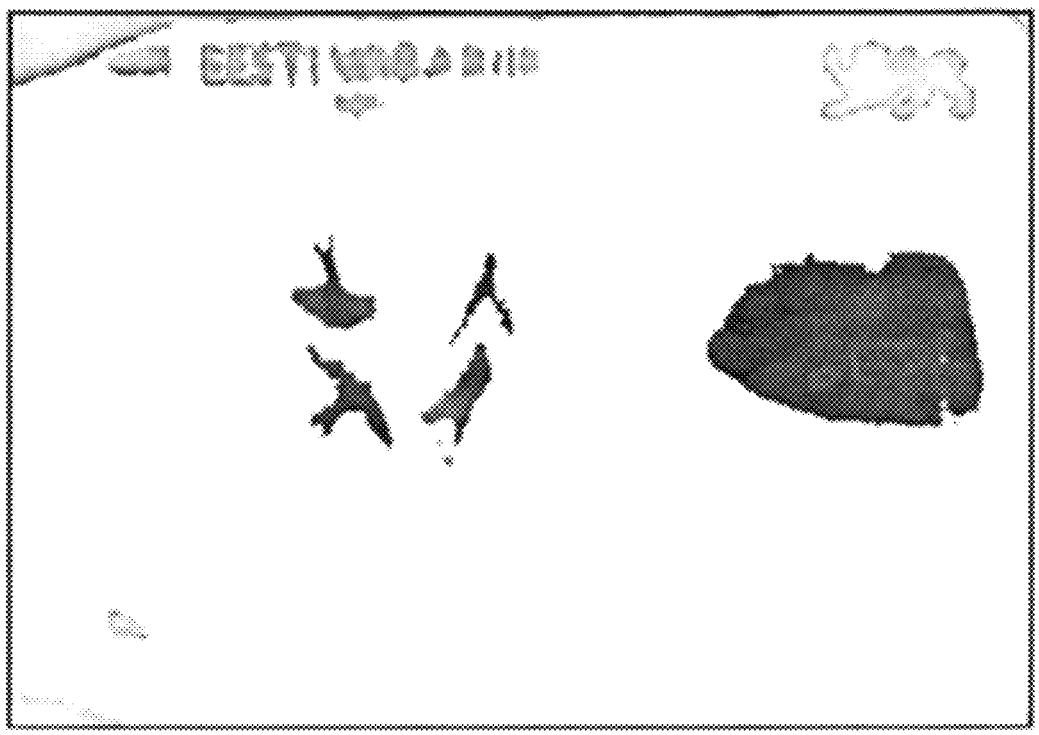
Figure 9:
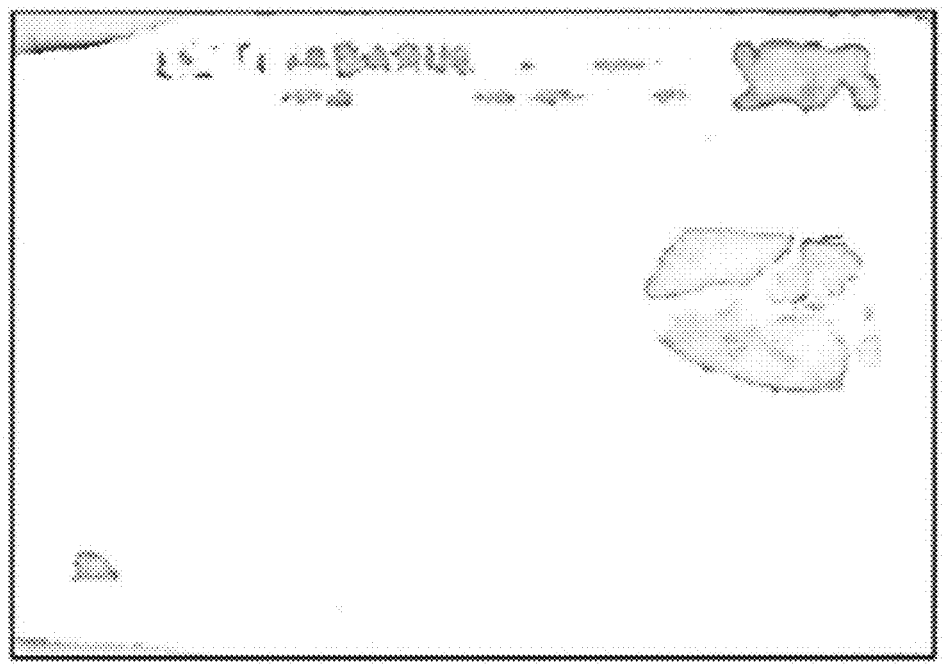

An illustration of this step is shown in FIG. 4 for a document containing holograms, and in FIG. 9 for a document not containing holograms.

Stage 5: Localization of areas containing holograms

The image $|\vec{C'}|$ is filtered (to remove accidental "parasitic" elements such as thin black lines and other pepper-type noise arising from inaccurate tracking) with further global binarization (for example, by threshold).

Figure 5:
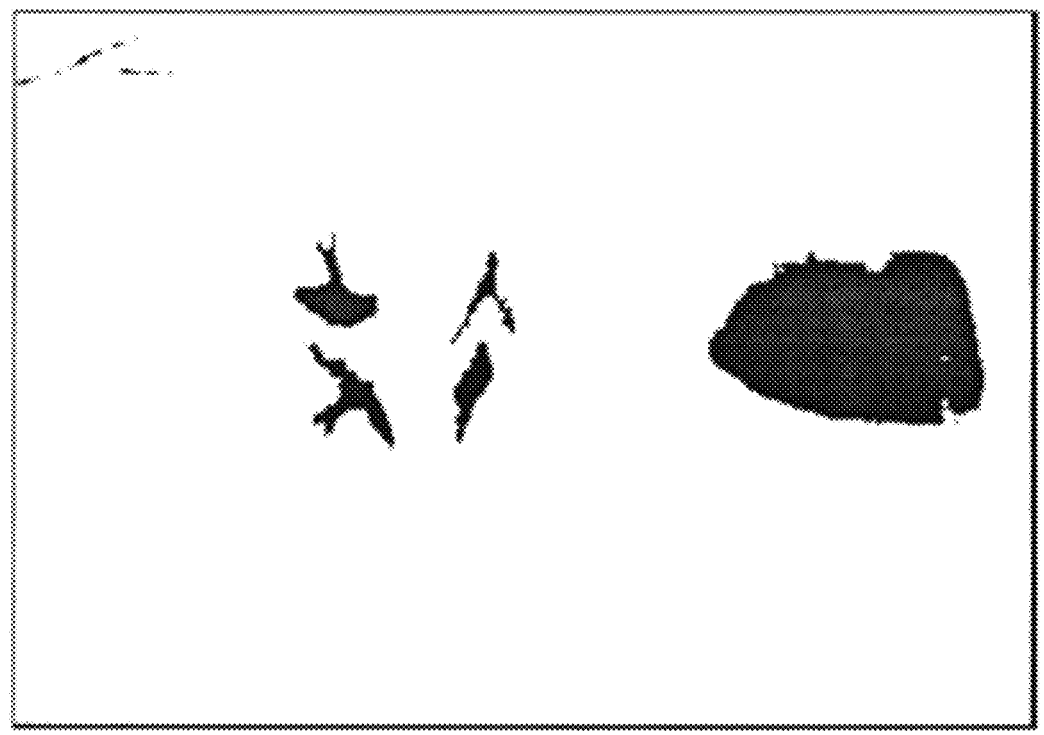
Figure 10:
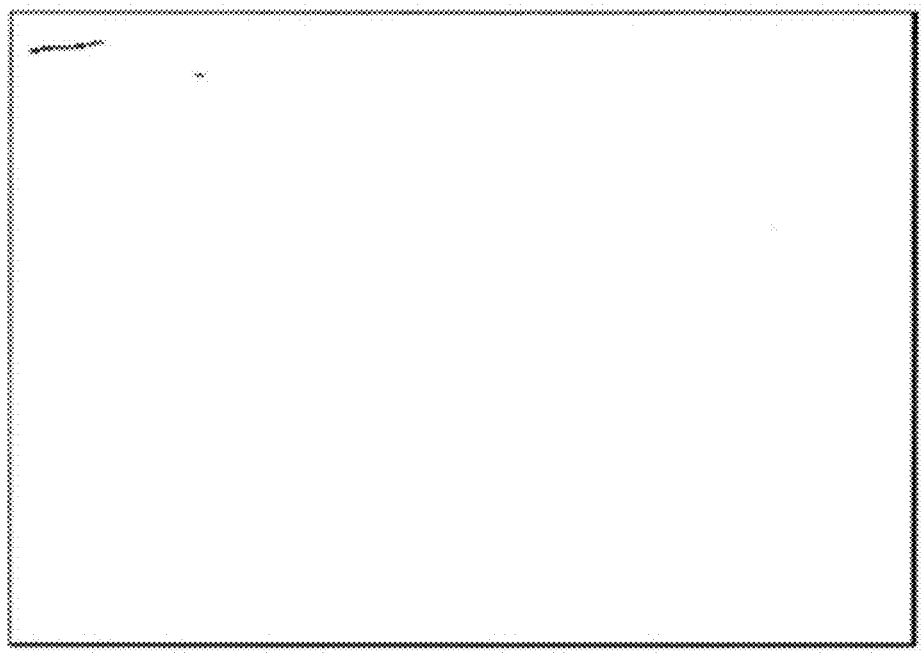

The result is shown in FIG. 5 for a document containing holograms, and in FIG. 10 for a document not containing holograms.

The binarized image contains connectivity components. The found connectivity components are additionally filtered in accordance with a priori knowledge about the shape of holograms on the document processed.

Figure 6:
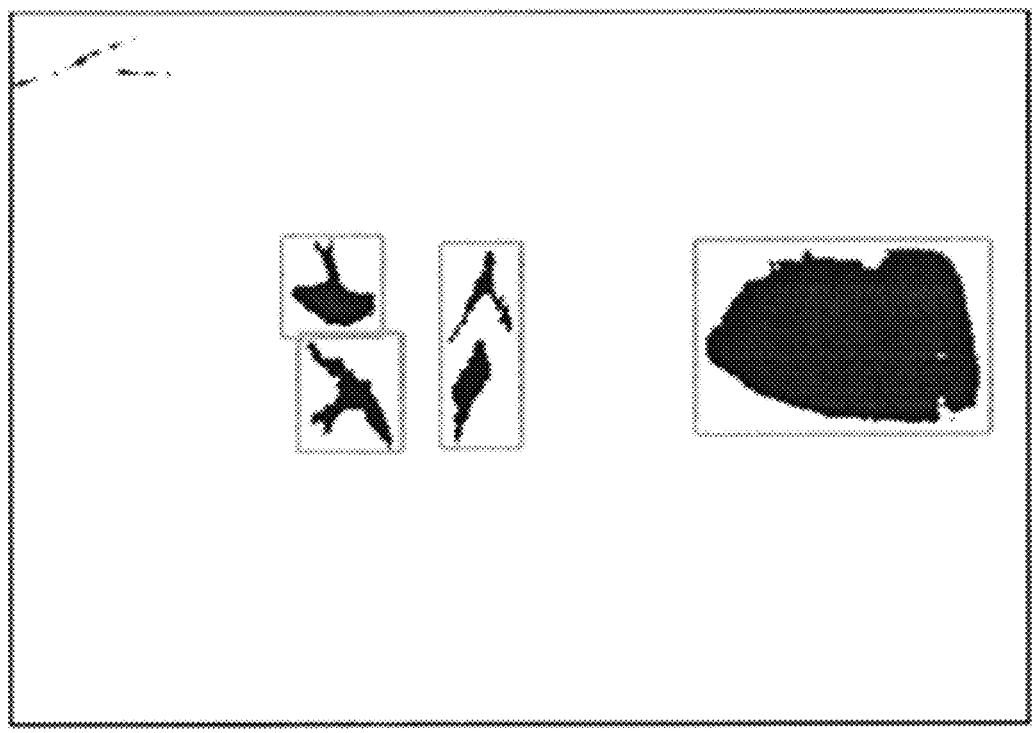
Figure 11:
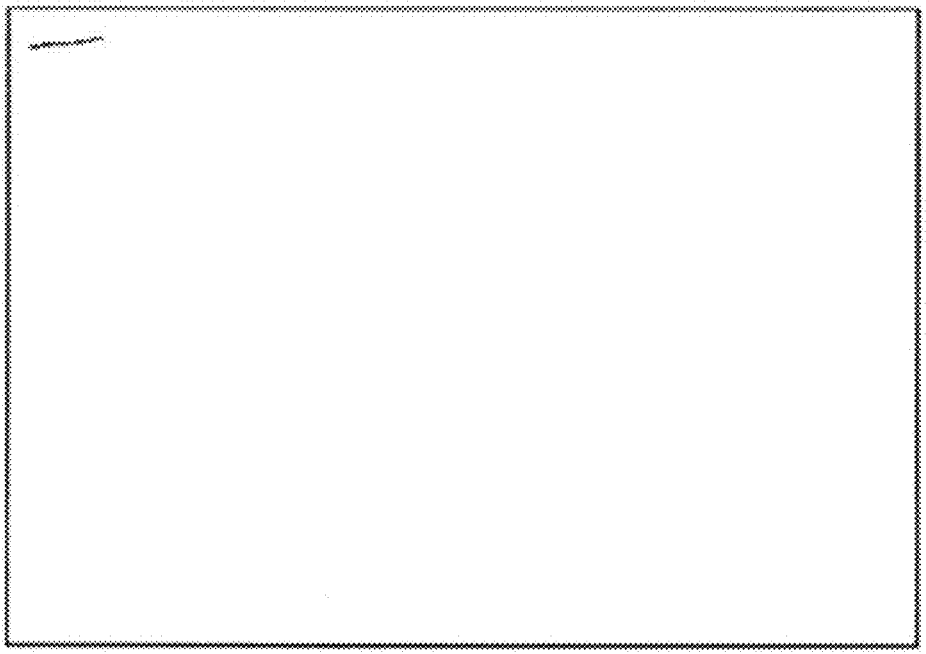

The final result is shown in FIG. 6 for a document containing holograms, and in FIG. 11 for a document not containing holograms.

Thus, the disclosed invention provides for an accurate matching of the coordinate system between frames, which allows the invention to not apply "averaging" and to not reduce the dimension of the analyzed images (providing for more accurate detection of holograms) by using tracking technologies, by not using color correction, it eliminates errors in hologram detection in cases of changing lighting conditions or errors in the automatic white balance system, as well as increases the reliability of detecting holographic elements, avoiding false detection errors on static color elements of the document, since the disclosed method relies on the analysis of both chrominance components (hue and saturation).

A method for detecting security holograms on documents in a video stream, which consists in detecting a document, characterized in that the document is localized in the first frame of the video stream, and if the document is not found, the frame is skipped, and the action is repeated with a new frame of the video stream until successful localization, a new frame is captured in the video stream, a document is searched for in it by performing the following steps: search for interest points and calculation of descriptors in the current frame; filtering of interest points in the previous frame so that only points located inside the quadrangle of the outer borders of the document remain; matching the descriptors of interest points of the current and previous frames; application of the algorithm for estimating the parameters of projective transformation between frames; projective transformation of the quadrangle of the outer boundaries of the document from the previous frame to get the outer boundaries of the document in the current frame; normalization of the document image, while the image of the found document is projectively displayed in a rectangle with a known size, the resulting image is color-corrected to be resistant to changes in lighting, as well as to undesirable changes that may occur due to automatic white balancing by the video camera; calculating saturation and hue, wherein for each pixel of the document image, a chromaticity vector is calculated, the modulus of which is equal to saturation, and the angle is equal to hue; updating the saturation and hue values, further considering the pixels of the normalized document image, the brightness values of which do not exceed the specified threshold, while for each pixel of the normalized document image, the brightness value of which does not exceed the specified threshold, the following values are updated, calculated for all processed images of the document: maximum saturation value; average value of chromaticity vectors; a new image is formed, the image is filtered, the connectivity components are found on the binarized image, the found connectivity components are additionally filtered in accordance with a priori knowledge about the shape of the holograms on the analyzed document.

What is claimed is:

1. A method for detecting security holograms on documents in a video stream, the method comprising:
   localizing a document in the video stream;
   normalizing a document image of the localized document while the document image is projected into a rectangle with a known size, wherein the normalized document image is color-corrected to be resistant to changes in lighting and automatic white balancing;
   calculating a chromaticity vector for each pixel of the normalized document image, wherein the modulus of the chromaticity vector is equal to a saturation of the pixel and the angle of the chromaticity vector is equal to a hue of the pixel;
   updating saturation and hue values for each pixel of the normalized document image, the brightness value of which does not exceed a specified threshold, wherein the updated saturation and hue values include: (i) the maximum saturation value of all processed images of the document and (ii) the average value of the chromaticity vectors of all processed images of the document;
   generating a new image using pixels having updated saturation and hue values;
   filtering the new image using binarization; and
   finding connectivity components in the filtered image and filtering the connectivity components in accordance with a priori knowledge about a shape of holograms of the document.

2. The method of claim 1, wherein localizing the document in the video stream comprises:
   searching for key points and calculating descriptors of the key points in a current frame of the video stream;
   filtering by the key points in a previous frame of the video stream so that only points located inside a quadrangle of outer borders of the document remain;
   matching the descriptors of the key points between the current frame and the previous frame;
   applying an algorithm for estimating parameters of a projective transformation between the current and previous frames; and
   performing the projective transformation of the quadrangle of the outer boundaries of the document from the previous frame to get the outer boundaries of the document in the current frame.

* * * * *